(12) United States Patent
Effenberger

(10) Patent No.: US 8,121,479 B2
(45) Date of Patent: Feb. 21, 2012

(54) OPTICAL NETWORK TERMINAL MANAGEMENT AND CONTROL INTERFACE (OMCI) CONTAINING A DESCRIPTION OF THE OMCI

(75) Inventor: Frank J. Effenberger, Freehold, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 1091 days.

(21) Appl. No.: 11/677,336

(22) Filed: Feb. 21, 2007

(65) Prior Publication Data
US 2008/0037986 A1 Feb. 14, 2008

Related U.S. Application Data

(60) Provisional application No. 60/822,161, filed on Aug. 11, 2006.

(51) Int. Cl.
*H04L 12/28* (2006.01)
*H04L 12/56* (2006.01)
*H04B 14/00* (2006.01)
*H04B 1/74* (2006.01)
*G06F 15/173* (2006.01)
*G06F 13/36* (2006.01)
*H04B 10/08* (2006.01)
*G06F 9/46* (2006.01)

(52) U.S. Cl. ........... 398/58; 398/43; 398/44; 398/17; 398/63; 398/71; 370/395.51; 370/236; 370/465; 709/223; 709/224; 714/43; 718/100

(58) Field of Classification Search ........... 398/58, 398/43
See application file for complete search history.

(56) References Cited

U.S. PATENT DOCUMENTS

| 7,095,955 B2 * | 8/2006 | Bernard et al. .......... 398/16 |
| 7,277,637 B2 * | 10/2007 | Jette et al. .......... 398/70 |
| 2004/0208631 A1 | 10/2004 | Song et al. |
| 2005/0163504 A1 | 7/2005 | Bernard et al. |
| 2005/0185631 A1 * | 8/2005 | Bernard et al. .......... 370/350 |
| 2006/0120723 A1 * | 6/2006 | Diouf et al. .......... 398/71 |

(Continued)

FOREIGN PATENT DOCUMENTS
WO 2005055580 A1 6/2005
(Continued)

OTHER PUBLICATIONS
ITUT G.983.2.*
(Continued)

*Primary Examiner* — Shi K Li
*Assistant Examiner* — Oommen Jacob
(74) *Attorney, Agent, or Firm* — Conley Rose, P.C.; Grant Rodolph; Stephen R. Loe

(57) ABSTRACT

A network component is disclosed that includes a memory comprising a data structure comprising an optical network terminal management and control interface (OMCI) comprising a plurality of managed entities (MEs), wherein one of the MEs is a description of the OMCI. Also disclosed is a network component comprising a processor configured to implement a method comprising promoting the sending of an OMCI Description to an optical line terminal (OLT), wherein the OMCI Description comprises an OMCI Object, whose instance describes the types of MEs supported by an OMCI, a plurality of Managed Entity Objects, whose instances describe each ME supported by the OMCI, and a plurality of Attribute Objects, whose instances describe each attribute supported by the OMCI.

20 Claims, 3 Drawing Sheets

U.S. PATENT DOCUMENTS

| | | | |
|---|---|---|---|
| 2006/0228113 A1* | 10/2006 | Cutillo et al. | 398/71 |
| 2007/0109974 A1* | 5/2007 | Cutillo et al. | 370/254 |
| 2007/0274718 A1* | 11/2007 | Bridges et al. | 398/63 |
| 2008/0019689 A1* | 1/2008 | Brooks et al. | 398/17 |
| 2008/0037986 A1* | 2/2008 | Effenberger | 398/58 |
| 2008/0253769 A1* | 10/2008 | Liu | 398/58 |

FOREIGN PATENT DOCUMENTS

| | | | |
|---|---|---|---|
| WO | WO 2005055580 A1 * | 6/2005 | |
| WO | WO 2005099298 A1 * | 10/2005 | |
| WO | 2005115043 A1 | 12/2005 | |

OTHER PUBLICATIONS

ITUT G.984.4.*

ITUT G.984.4 (Feb. 2008).*

ITUT G. 983.2 (Jul. 2005).*

Foreign Communication From a Related Counterpart Application—International Search Report and Written Opinion, PCT/CN2007/070444, Nov. 15, 2007, 10 pages.

International Telecommunication Union, Series G: Transmission Systems and Media, Digital Systems and Networks, Jun. 2004, 114 pgs., G.984.4, Switzerland.

International Telecommunication Union, Series G: Transmission Systems and Media, Digital Systems and Networks, Mar. 2006, 32 pgs. G.984.4 Amendment 2, Switzerland.

"Series G: Transmission Systems and Media, Digital Systems and Networks, Digital Sections and Digital Line System-Optical Line Systems for Local and Access Networks,ONT Management and Control Interface Specification for B-PON," ITU-T Recommendation G.983.3, Jul. 2005.

Foreign Communication from a counterpart application, Chinese application 200780001618.8, Office Action dated May 8, 2009, 3 pages.

Foreign Communication from a counterpart application, Chinese application 200780001618.8, Office Action dated Feb. 5, 2010, 3 pages.

Foreign Communication from a counterpart application, Chinese application 200780001618.8, Partial English Translation of Office Action dated Feb. 5, 2010, 3 pages.

"Universal Plug and Play Device Architecture, Version 1.0", Internet Citation, [Online] XP002210614, Retrieved from Internet Jun. 8, 2002: URL:http://www.upnp.org.

"Gigabit-Capable Passive Optical Networks (G-PON): ONT Management and control Interface Specification", ITU-T Recommendation G.984.4 Jun. 2004.

Foreign Communication From a Related Counterpart Application—European Search Report, EP Application 07800920.6, Jun. 22, 2009, 18 pages.

* cited by examiner

OPTICAL NETWORK TERMINAL MANAGEMENT AND CONTROL INTERFACE (OMCI) CONTAINING A DESCRIPTION OF THE OMCI

CROSS-REFERENCE TO RELATED APPLICATIONS

This application claims priority to U.S. Provisional Application Ser. No. 60/822,161, filed Aug. 11, 2006 by Frank J. Effenberger and entitled "OMCI Description of the OMCI," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network terminals (ONTs) at the customer premises. Downstream data transmissions may be broadcast to all of the ONTs, while upstream data transmissions may be transmitted to the OLT using time division multiple access (TDMA) or wave division multiple access (WDMA). To aid in the management and control of the plural ONTs, an optical management and control interface (OMCI) is provided at the OLT and the ONTs.

There are several problems associated with the existing OMCI. One of the problems associated with the OMCI is that many portions of the OMCI are not required, but are instead optional or conditional. Thus, the OLT cannot know which portions of the OMCI that a particular ONT supports. Another problem associated with the OMCI is that the OMCI is frequently upgraded. Thus, the OLT and/or ONTs may support a particular version of the OMCI for a time, but then may not support the upgraded versions of the OMCI. Further, the plural ONTs may not have the same configurations. For example, one ONT in a PON may support a certain OMCI version with certain OMCI features, while another ONT in the same PON may support a different OMCI version with different OMCI features. Finally, the OMCI has to be customized to different manufacturers' equipment. If the OMCI is configured for one manufacturer's ONTs and is installed in the OLT in such a configuration, then the OMCI will not recognize the OMCI from other manufacturers' ONTs. Consequently, a need exists for a solution that overcomes the defects in the existing OMCI.

SUMMARY

In a first embodiment, the disclosure includes a network component comprising: a memory comprising a data structure comprising an OMCI comprising a plurality of managed entities (MEs), wherein one of the MEs is a description of the OMCI.

In a second embodiment, the disclosure includes a network component comprising a processor configured to implement a method comprising promoting the sending of an OMCI Description to an OLT, wherein the OMCI Description comprises an OMCI Object, whose instance describes the types of MEs supported by an OMCI, a plurality of Managed Entity Objects, whose instances describe each ME supported by the OMCI, and a plurality of Attribute Objects, whose instances describe each attribute supported by the OMCI.

In a third embodiment, the disclosure includes a network component comprising: a processor configured to implement a method comprising: detecting an ONT, promoting the sending of a request for an OMCI Description to the ONT, and recognizing reception of the OMCI Description from the ONT.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a PON comprising an ONT that contains an OMCI Description of the OMCI. The OMCI Description includes a plurality of managed entities (MEs) that generally describe which OMCI features are supported by the ONT. The QMCI Description can be sent to the OLT to inform the OLT of the features that the ONT's OMCI supports. The OLT can then use the OMCI Description to modify the messages it sends to the ONT. By doing so, the OLT may communicate more efficiently with the ONTs.

Figure 1:
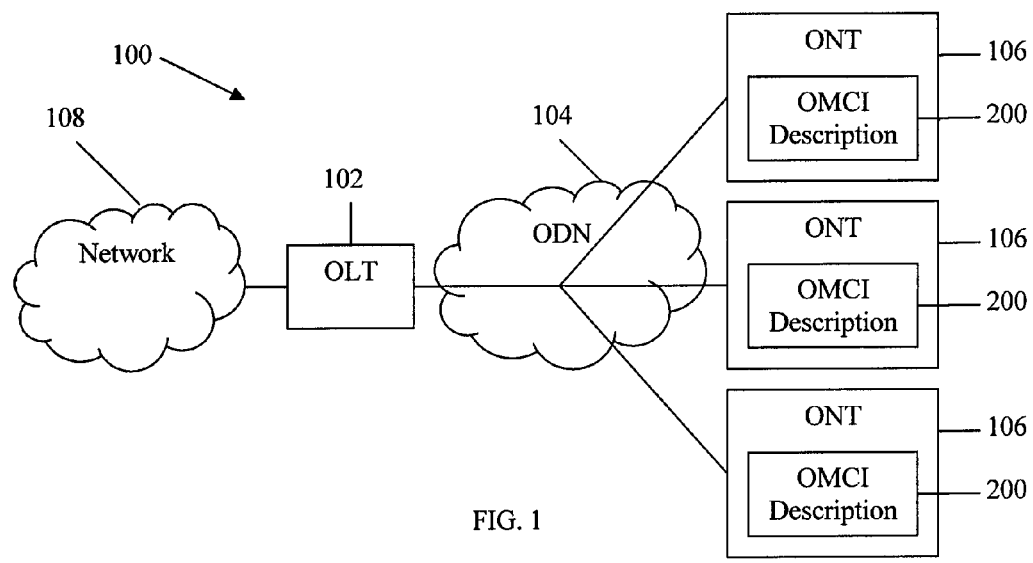
FIG. 1 is a framework of one embodiment of a PON.

FIG. 1 illustrates one embodiment of a PON 100. The PON 100 communicates with a network 108, and comprises an OLT 102, an ODN 104, and a plurality of ONTs 106 each containing an OMCI Description 200. The PON 100 is a communications network that does not require any active components to distribute data between the OLT 102 and the ONTs 106. Instead, the ODN 104 uses passive optical components to distribute data between the OLT 102 and the ONTs 106. Examples of suitable PONs include the asynchronous transfer mode PON (APON) and the broadband PON (BPON) defined by the ITU-T G.983 standard, the Gigabit PON (GPON) defined by the ITU-T G.984 standard, the Ethernet PON (EPON) defined by the IEEE 802.3ah standard, and the wavelength division multiplexing PON (WDM-PON), all of which are incorporated by reference as if reproduced in their entirety.

One component of the PON 100 is the OLT 102. The OLT 102 may be any device that is configured to communicate with the ONTs 106 and the network 108. Specifically, the OLT 102 may act as an intermediary between the network 108 and the ONTs 106 in that the OLT 102 forwards data received from the network 108 to the ONTs 106, and forwards data received from the ONTs 106 to the network 108. Although the specific configuration of the OLT 102 may vary depending on the type of PON 100, in an embodiment the OLT 102 comprises a network transceiver with an optional multiplexer that sends/receives signals to/from the network 108, and an optical transceiver with an optional multiplexer that sends/receives optical signals to/from the ONTs 106. If the network 108 is using a protocol, such as Ethernet or SONET/SDH, that is different from the communications protocol used in the PON 100, then the OLT 102 may also comprise a converter that converts the network 108 data into the PON protocol and converts the PON data into the network 108 protocol. The OLT 102 described herein is typically located at a central location such as a central office, but may be located at other locations as well.

Another component of the PON 100 is the ONTs 106. The ONTs 106 may be any devices that are configured to communicate with the OLT 102 and a customer or user (not shown). Specifically, the ONTs 106 may act as an intermediary between the OLT 102 and a customer in that the ONTs 106 forward data received from the OLT 102 to the customer, and forward data received from the customer to the OLT 102. Thus, from the customer's perspective the ONT 106 may be seen as an access node where data is sent and received. Although the specific configuration of the ONTs 106 may vary depending on the type of PON 100, in an embodiment the ONTs 106 comprise an optical transceiver that sends/receives optical signals to/from the OLT 102, and a converter that converts the optical signal into electrical signals, such as signals in the ATM or Ethernet protocol. The ONTs 106 may also comprise a second transceiver that sends/receives the electrical signals to a customer device. In some embodiments, ONTs and optical network units (ONUs) are similar, and thus the terms are used interchangeably herein. The ONTs 106 described herein are typically located at distributed locations such as the customer premises, but may be located at other locations as well.

Another component of the PON 100 is the ODN 104. The ODN 104 may be a data distribution system comprising optical cables, couplers, splitters, distributors, and other equipment known to persons of ordinary skill in the art. In an embodiment, the optical cables, couplers, splitters, distributors, and other equipment are passive optical components. Specifically, the optical cables, couplers, splitters, distributors, and other equipment may be components that do not require any power to distribute data signals between the OLT 102 and the ONTs 106.

The PON 100 may be configured to communicate with the network 108. The network 108 may be any form of network that is in communication and exchanges data with the OLT 102, the ODN 104, or the ONTs 106. In embodiments, the network 108 may be a packet switched network (PSN), an intranet, the Internet, a local area network (LAN), a public switched telephone network (PSTN), or any other network known to persons of ordinary skill in the art. In addition, the network 108 may be some kind of data network, switch, base station, or video server. Persons of ordinary skill in the art are aware of other embodiments of the network 108.

The PON 100 may use a variety of data transmission schemes to transfer data between the OLT 102 and the ONTs 106. In one embodiment, the PON 100 uses TDMA as the data transmission scheme. In such an embodiment, the downstream data can be broadcast from the OLT 102 to all of the ONTs 106, and the upstream traffic can be sent by the ONTs 106 to the OLT 102 using timeslots assigned to each ONT 106. In another embodiment, the data transmission scheme is WVDM, a technology that multiplexes multiple optical carrier signals on a single optical fiber by using different light wavelengths to carry different signals. Specifically, the OLT's 102 transmitter may be configured to transmit the downstream signals at one wavelength, and each of the ONTs 106 transmitters may be configured to transmit their upstream signals using different wavelengths. Persons of ordinary skill in the art are aware of other data transmission schemes that can be used in the PON 100.

In an embodiment, the ONTs 106 and/or the OLT 102 are configured with an OMCI. The OMCI is used by the OLT 102 and the ONTs 106 to aid in communication with and control of the ONTs 106 by the OLT 102. Specifically, the OMCI is an object-oriented data structure that describes a management information base (MIB) that is used for all management functions of the ONT 106. The OMCI may be modular in that new MEs can be added to support incremental capabilities to meet different levels of customer needs. Each ME is an abstract representation of a resource and/or service supported by the OMCI. Specifically, each ME may describe the purpose of the ME, the relationship between the ME and other MEs, and the attributes of the ME. Moreover, each ME may comprise a plurality of attributes and properties, and the attributes may have properties themselves. Specific examples of suitable OMCIs are described in ITU G.983.2 entitled "ONT Management and Control Interface Specification for B-PON," and ITU G.984.4 entitled "Gigabit-Capable Passive Optical Networks (G-PON): ONT Management and Control Interface Specification," both of which are incorporated herein by reference as if reproduced in their entirety.

One of the MEs within the OMCI may be the OMCI Description 200. The OMCI Description 200 describes the characteristics of the OMCI in general, rather than providing a detailed description of the OMCI. Thus, when the OMCI Description 200 resides in the ONT 106 and is sent to the OLT 102, the OLT 102 can use the OMCI Description 200 to determine which versions of the OMCI the ONT 106 supports, and which specific OMCI features that the ONT 106 supports. More specifically, the OLT 102 can use the OMCI Description 200 to modify the messages that the OLT 102 sends to the ONT 106 such that the ONT 106 only receives messages that it can understand and process. Such a process may reduce or substantially eliminate the occurrence of error messages between the OLT 102 and the ONT 106 due to transmission of messages associated with OMCI versions and/or features that the ONT 106 and/or the OLT 102 do not support. The OMCI Description 200 typically resides in the ONT 106, as illustrated, but can also reside in the OLT 102, or both the OLT 102 and the ONT 106.

Figure 2:
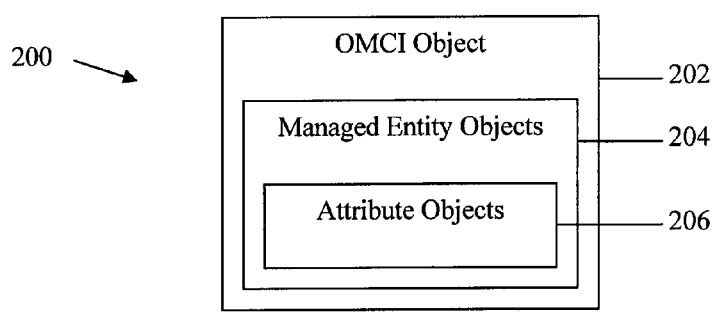
FIG. 2 is a framework of one embodiment of the OMCI Description.

FIG. 2 illustrates one embodiment of the OMCI Description 200. Specifically, the OMCI Description 200 may comprise an OMCI Object 202, the OMCI Object 202 may comprise at least one Managed Entity Object 204, and the Managed Entity Object 204 may comprise at least one Attribute Object 206. In a specific embodiment, the OMCI Description 200 comprises only one OMCI Object 202, about 100 Managed Entity Objects 204, and about 500 Attribute Objects 206. While the OMCI Object 202, the Managed Entity Object 204, and the Attribute Objects 206 are all defined in terms of objects, such is done merely for the sake of convenience. Persons of ordinary skill in the art will be aware that these objects are MEs, and that the terms object and ME are interchangeable. The OMCI Object 202, the Managed Entity Object 204, and the Attribute Object 206 are described in detail below.

In an embodiment, the OMCI Description 200 includes an OMCI Object 202. The OMCI Object 202 is a ME that describes the ONT's 106 general level of support for the OMCI's MEs and messages. Specifically, the OMCI Object 202 describes a plurality of ME types and a plurality of message types supported by the OMCI, rather than providing any information about the specific MEs or messages. The OMCI Object 202 may include a plurality of attributes and actions that further describe the OMCI Object 202. In some embodiments, the OMCI Object 202 may also contain notifications, although notifications are not required in the OMCI Object 202. Generally, only a single instance of the OMCI Object 202 is contained within the OMCI Description 200.

The OMCI Object 202 may include a ME Identifier (ID) attribute, a ME Type Table attribute, and a Message Type Table attribute. The ME ID attribute may be an attribute that contains data that provides a unique number for each instance of the OMCI Object 202. There is typically only one instance of the ME ID attribute in each OMCI Object 202, and it may be defined as a two-byte field with the number 0x0000. The ME Type Table attribute may be an attribute that lists the ME classes supported by the ONT 106. Each entry in the ME Type Table typically contains the ME class value for the ME, which may be defined in table 18 of ITU G.984.4. In cases where the MEs have been inherited from an ITU G.983.2-type BPON, the most significant byte in this attribute will be zero. The ME Type Table may contain N*2 bytes, where N is the number of entries in the list. The Message Type Table attribute may be an attribute that lists the various message types supported by the ONT 106. Each entry in the Message Type Table typically contains the message type of an OMCI message, which may be defined in table 17 of ITU G.984.4. The Message Type Table may contain M*1 bytes, where M is the number of entries in the list.

In addition to the attributes, the OMCI Object 202 may also contain a Get action and a Get Next action. The Get action may call for one or more attributes. Specifically, the Get action may latch a snapshot of the current instance, and respond with the size of data that should be obtained using the Get Next action. In contrast, The Get Next action may get the latched attribute values of the ME within the current snapshot.

In an embodiment, the OMCI Description 200 may include a Managed Entity Object 204. The Managed Entity Object 204 is a ME that describes the details of each ME supported by the OMCI. The Managed Entity Object 204 may include a plurality of attributes and actions that further describe the Managed Entity Object 204. In some embodiments, the Managed Entity Object 204 may also contain notifications, although notifications are not required in the Managed Entity Object 204. Generally, a plurality of instances of the Managed Entity Object 204 are contained within the OMCI Description 200.

The Managed Entity Object 204 may include an ME ID attribute, a Name attribute, and an attributes table attribute. The ME ID attribute may provide a unique number for each instance of the Managed Entity Object's ME. The ME ID's value may be equal to the ME type value, and may be the same two-byte code found in the ME Type Table attribute of the OMCI Object 202. The Name attribute may contain a 25-byte ASCII coded mnemonic tag for the ME type. Strings shorter than 25 bytes may be padded with null characters, which are characters that fill space and/or time, but do not add anything to the meaning of a transmitted message. The Attributes Table attribute may contain pointers to the attribute MEs that describe each of the Managed Entity Object's attributes. The ME ID attribute may be excluded from the Attributes Table because the Attributes Table type may be fixed. The term fixed may mean that the value sent and/or received follows a predetermined sequence, or may fit into a specific length and format. The Attributes Table may contain X*2 bytes, where X is the number of entries in the list.

The Managed Entity Object 204 may also include an Access attribute, an Alarms Table attribute, and an Attribute Value Change (AVC) table attribute. The Access attribute may represent the creator of the Managed Entity Objects 206. Specifically, the Access attribute may be a one-byte field that defines whether the Managed Entity Object 204 was created by the ONT 106, the OLT 102, or created by both the ONT 106 and the OLT 102. The Alarms Table attribute may list the various alarm codes that are supported. The alarm code may contain Y*1 bytes, where Y is the number of entries in the list. The AVC Table attribute may list the AVCs that are supported by the Managed Entity Object 204. The AVCs Table may contain Z*1 bytes, where Z is the number of entries in the list.

The Managed Entity Object 204 may also include an Actions attribute, an Instances Table attribute, and a Support attribute. The Actions attribute may contain the action codes supported by the Managed Entity Object 204. Within the Actions attribute, the least significant bit may represent action 0, the next least significant bit may represent action 1, and so on. The action codes may include the message types from table 17 of ITU G.984.4, and may be formatted as a four-byte bitmap. The Instances Table attribute may contain a list of pointers to all instances of the Managed Entity Objects 204. The Instances Table attribute may contain V*2 bytes, where V is the number of entries in the list. The Support attribute may represent the support capability of the Managed Entity Objects 204 in the ONT's implementation. The Support attribute may declare whether the OMCI implementation complies with the OMCI declaration itself, rather than with the recommendations. The Support attribute may be supported as defined in the Managed Entity Object 204, may be unsupported such that the OMCI will return an error code if accessed, may be partially supported such that some aspects of the ME are supported, or may be ignored such that the OMCI is supported, but the underlying function is not.

The Managed Entity Objects 204 may also include a Get action and a Get Next action. The Get action may get one or more attributes. If the attribute is a table attribute, then the Get action may latch a snapshot of the current instance and responds with the size of data that should be obtained using the Get Next action. The Get Next action may get the latched attribute values of the table ME within the current snapshot.

In an embodiment, the OMCI Description 200 may include at least one Attribute Object 206. The Attribute Object 206 is an ME that is used to describe each attribute type that is supported by the OMCI. In an embodiment, there could be one or more attribute entities related to each ME. The Attribute Object 206 may include a plurality of attributes and actions that further describe the Attribute Object 206. For example, the Attribute Object 206 may also support the Get action, which gets one or more attributes. In some embodiments, the Attribute Object 206 may also contain notifications, although notifications are not required in the Attribute Object 206. Generally, a plurality of instances of the Attribute Object 206 are contained within the OMCI Description 200, however only one instance of the Attribute Object 206 may exist for every type of attribute supported by the OMCI.

The Attribute Object 206 may include a ME ID attribute, a Name attribute, and a Size attribute. The ME ID attribute may provide a unique number for each instance of the Attribute Object 206. The ME ID number may be the same as occurs in the Attributes table in the Managed Entity Object 204. Only one instance of each unique attribute may need to be created. The ONT 106 can assign attribute numbering from the pool of 64-kilobyte (KB) IDs using any allocation scheme; however, a rational numbering scheme may aid human readability. The Name attribute may contain a 25-byte mnemonic tag for the attribute. Strings shorter than 25 bytes may be padded with null characters. The Size attribute is a two-byte field that contains the size of the attribute, in bytes.

The Attribute Object 206 may also include an Access attribute, a Format attribute, and a Lower Limit attribute. The Access attribute may be a one-byte field that represents the OMCI's access characteristics of the attribute. Embodiments of code points for the Access attribute are as follows: read, write, read and write, read and set-by-create, write and set-by-create, and read, write, and set-by-create. The Format attribute may be a one-byte field that represents the format of the attribute. Suitable code points for the Format attribute include pointer, bit field, signed integer, unsigned integer, string, enumeration (e.g., a set of defined code points), and table. The Lower Limit attribute may be a four-byte field that provides the lowest value for the attribute. The Lower Limit attribute may only be valid for the numeric types, such as pointer, signed integer, and unsigned integer. For attributes smaller than four bytes, the desired numerical value may be expressed in four-byte representation such that the signed one-byte integer 0xFE may be expressed as 0xFFFFFFFE and the unsigned one-byte integer 0xFE may be expressed as 0x000000FE.

The Attribute Object 206 may also include an Upper Limit attribute, a Bit Field attribute, a Code Points Table attribute, and a Support attribute. The Upper Limit attribute may be a four-byte field that provides the highest value for the attribute, and has the same validity and format as the Lower Limit attribute. The Bit Field attribute may be a four-byte field that provides a mask of the supported bits in a Bit Field attribute. The Bit Field attribute may only be valid for the bit field type. A '1' in any position signifies that its code point is supported, whereas a '0' in a position indicates that its code point is not supported. For bit fields smaller than four bytes, the attribute is aligned at the least significant end of the mask. The Code Points Table may list the code points supported by an enumerated attribute. The Code Points Table may be Q*2 bytes, where Q is the number of entries in the list. The Support attribute may be a one-byte field that represents the level of support of the attribute, and may be the same notation as the Support attribute in the Managed Entity Object 204. Options within the Support attribute may include: fully supported as defined in the Attributes Object 206, unsupported in that the OMCI will return an error code if accessed, partially supported in that some aspects of the attribute are supported, and ignored in that the OMCI is supported, but the underlying function is not.

Figure 3:
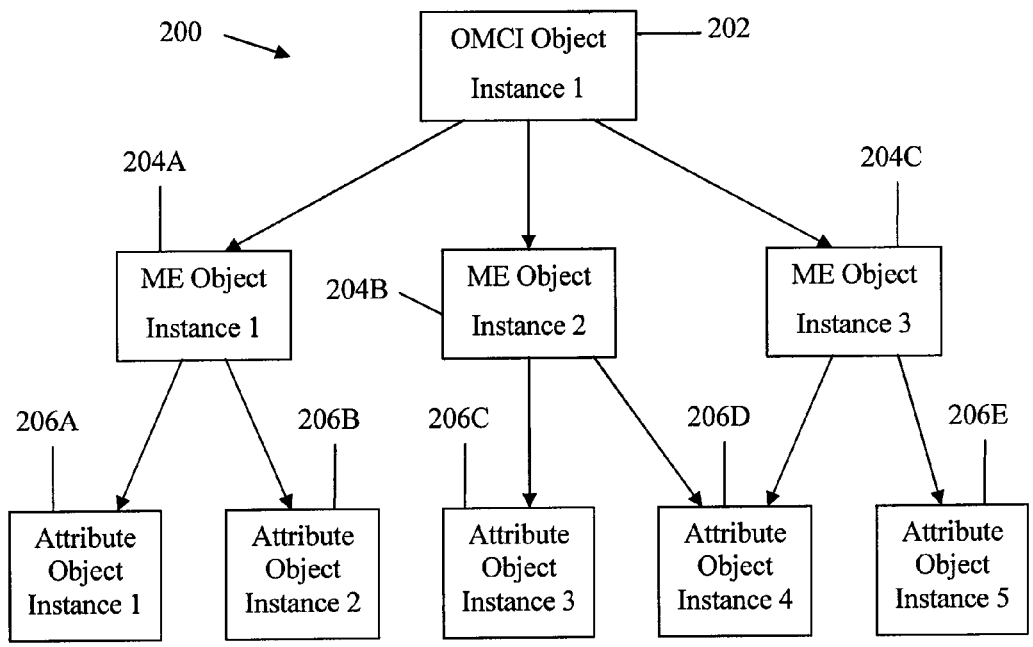
FIG. 3 is an example of the hierarchy of the OMCI Description.

FIG. 3 illustrates one example of the relationship between the various objects in the OMCI Description 200. As shown in FIG. 3, the OMCI Description 200 may comprise a single OMCI Object 202, whose instance describes the various ME types and message types supported by the OMCI. The OMCI Object 202 may be associated with three ME Object 204A, 204B, 204C, whose instances describe each ME supported by the OMCI. Further, the three ME Objects 204A, 204B, 204C may be associated with five Attribute Objects 206A, 206B, 206C, 206D, 206E, whose instances describe each attribute supported by the OMCI. Because there is only one instance of each Attribute Object 206A, 206B, 206C, 206D, 206E for each attribute supported by the OMCI, there may not be a one-to-one correlation between the ME Objects 204A, 204B, 204C and the Attribute Objects 206A, 206B, 206C, 206D, 206E. More specifically and as illustrated in FIG. 3, several Attribute Objects 206A, 206B, 206C, 206D, 206E may be associated with a single ME Object 204A, 204B, 204C, and several ME Objects 204A, 204B, 204C may be associated with a single Attribute Object 206A, 206B, 206C, 206D, 206E.

Figure 4:
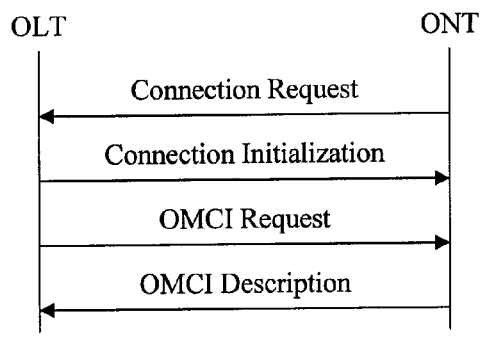
FIG. 4 is a flowchart of one embodiment of the signaling protocol between the OLT and the ONT.

FIG. 4 illustrates an embodiment of a flowchart of the signaling protocol between the OLT 102 and the ONT 106. Typically, when the ONT 106 is connected to the PON, the ONT 106 will send a connection request to the OLT 102, and the OLT 102 will respond with a connection initialization. However, this process may be reversed such that the OLT 102 recognizes that the ONT 106 has been connected to the PON 100, and initiates the connection initialization. In either case, as part of or after the connection initialization, the OLT 102 may request the OMCI Description 200 from the ONT 106. When the ONT 106 receives such as request, the ONT 106 sends the OMCI Description 200 to the OLT 102, such that both the OLT 102 and the ONT 106 are made aware of the OMCI version and features that the ONT 106 supports. Alternatively, the ONT 106 can send the OMCI Description 200 to the OLT 102 without being prompted by the OLT 102. Persons of ordinary skill in the art will appreciate that a similar process can be used to provide the ONT 106 with the OLT 102's OMCI Description 200, if desired.

In an embodiment, one or more of the OMCI Object, the Managed Entity Object, and the Attributes Object are exempt from the MIB audit process. The MIB audit is used when an ONT is ranged for service, and it is desirable that the MIB audit be completed as quickly as possible. Therefore, the MIB audit process can exclude the learning of the OMCI Description described herein. Rather, the recommended method of discovering the OMCI implementation is to use the ME that describes the Managed Entity Object itself. Such an ME contains the instances attribute, which lists all the instances of the Managed Entity Object, which can be subsequently uploaded.

An example can be used to illustrate the invention described herein. In this example, a PON exists comprising an OLT manufactured by company A, and ONTs B and C manufactured by companies B and C, respectively. Without the OMCI Description described herein, the OLT would have to be configured to support the ONTs made by companies B and C when the OLT is designed and manufactured. Only by such a configuration at the design stage can the OLT know which OMCIs are supported by ONTs B and C when ONTs B and C are connected to the OLT. However, such design stage configuration is unnecessary when the OMCI Description is implemented. When the ONTs B and C are connected to the PON, they send the OMCI Description to the OLT so that the OLT knows which OMCI features that the ONTs B and C support. Because the OMCI Description describes the OMCI generally and using the MEs, the OLT can read the OMCI Description sent by the ONTs B and C, and use the OMCI Description to modify the messages sent to the ONTs. Thus, the OLT does not send messages associated with OMCI features that the ONTs do not support, and the communication efficiency within the PON is increased.

Such a feature is even more beneficial when the ONTs B and C upgrade their OMCI or if an ONT manufactured by company D is added to the PON. In the absence of the OMCI Description, the OLT would have to be manually reconfigured, e.g. by a manual software upgrade, to support the new version of the OMCI in ONTs B and C or the new ONT D. However, such manual configuration is not necessary when the OMCI Description is used because the OMCI Description describes the OMCI generally using the MEs. Thus, when the OMCI Description is sent to the OLT, the OLT can read the OMCI Description, be made aware of the version and features supported by the upgraded ONTs' OMCIs or the new ONT's QMCI, and use the OMCI Description to modify the messages sent to the ONTs. Thus, the OLT does not send messages associated with OMCI features that the ONTs do not support, and the communication efficiency within the PON is increased.

Figure 5:
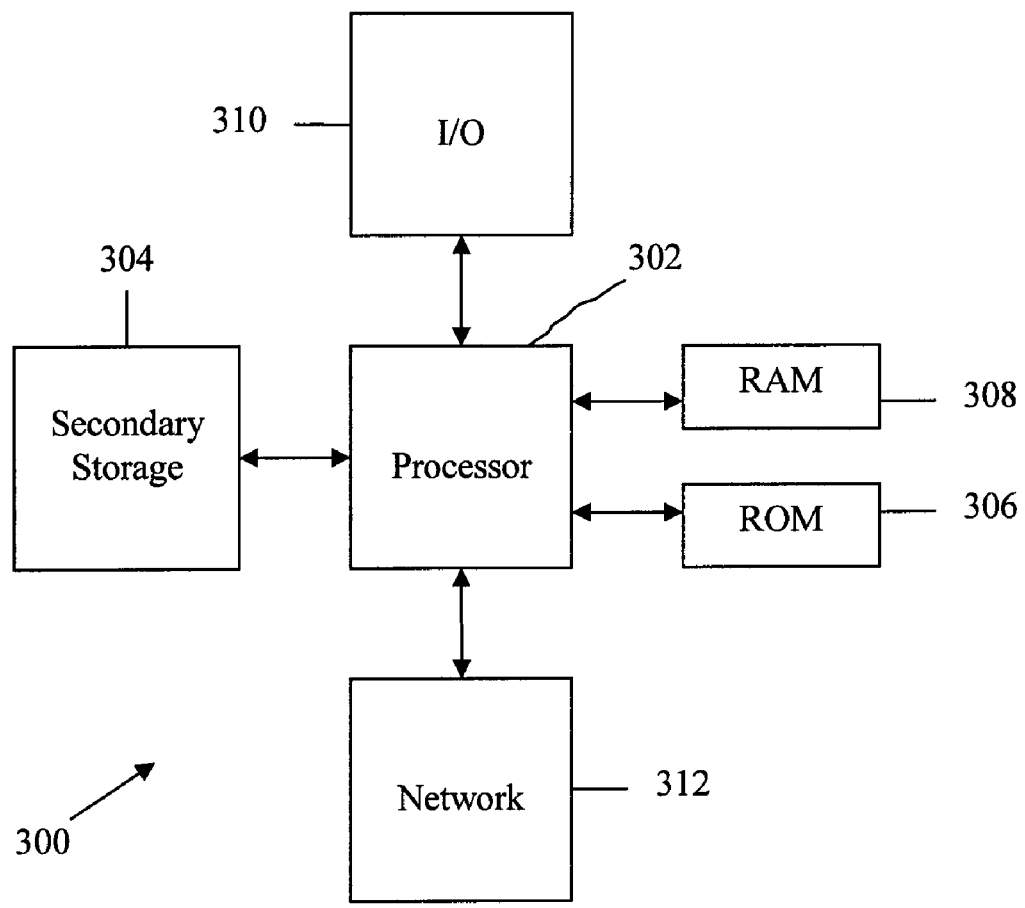
FIG. 5 illustrates an exemplary general-purpose computer system suitable for implementing the several embodiments of the disclosure.

The network components described above may be implemented on any general-purpose network component, such as a computer, network, or node, with sufficient processing power, memory resources, and network throughput capability to handle the necessary workload placed upon it. FIG. 5 illustrates a typical, general-purpose network component suitable for implementing one or more embodiments of a node disclosed herein. The network component 300 includes a processor 302 (which may be referred to as a central processor unit or CPU) that is in communication with memory devices including secondary storage 304, read only memory (ROM) 306, random access memory (RAM) 308, input/output (I/O) 310 devices, and network connectivity devices 312. The processor may be implemented as one or more CPU chips.

The secondary storage 304 is typically comprised of one or more disk drives or tape drives and is used for non-volatile storage of data and as an over-flow data storage device if RAM 308 is not large enough to hold all working data. Secondary storage 304 may be used to store programs that are loaded into RAM 308 when such programs are selected for execution. The ROM 306 is used to store instructions and perhaps data that are read during program execution. ROM 306 is a non-volatile memory device that typically has a small memory capacity relative to the larger memory capacity of secondary storage. The RAM 308 is used to store volatile data and perhaps to store instructions. Access to both ROM 306 and RAM 308 is typically faster than to secondary storage 304.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   a processor coupled to a memory configured to store a data structure comprising:
   an optical network terminal management and control interface (OMCI) comprising a plurality of managed entities (MEs), wherein one or more of the MEs comprises a description of the OMCI that indicates substantially all of a plurality of OMCI features that are supported by an optical network terminal (ONT), wherein the description of the OMCI comprises:
   an OMCI Object, whose instance describes a plurality of ME types and a plurality of message types supported by the OMCI;
   a plurality of Managed Entity Objects, whose instances describe each ME supported by the OMCI; and
   a plurality of Attribute Objects, whose instances describe each attribute supported by the OMCI,
   wherein one or more of the OMCI Object, the Managed Entity Objects, and the Attribute Objects are exempt from a management information base (MIB) audit process.

2. The component of claim 1, wherein the OMCI Object comprises: a ME Identifier (ID) attribute, a ME Type Table attribute, and a Message Type Table attribute.

3. The component of claim 1, wherein the Managed Entity Object comprises: a ME Identifier (ID) attribute, a Name attribute, an attributes table attribute, an Access attribute, an Alarms Table attribute, an Attribute Value Change (AVC) table attribute, an action attribute, an Instances Table attribute, and a Support attribute.

4. The component of claim 1, wherein the Attribute Object comprises: a ME Identifier (ID) attribute, a Name attribute, a Size attribute, an Access attribute, a Format attribute, a Lower Limit attribute, an Upper Limit attribute, a Bit Field attribute, a Code Points Table attribute, and a Support attribute.

5. The component of claim 1, wherein the description of the OMCI comprises only one OMCI Object.

6. The component of claim 1, wherein the Attribute Object comprises only one instance of each attribute supported by the OMCI.

7. The component of claim 1, wherein the network component is part of an optical line terminal (OLT).

8. The component of claim 1, wherein the network component is part of the ONT.

9. The component of claim 8, wherein the ONT further comprises:
   a transmitter configured to send optical signals to an optical line terminal (OLT);
   a receiver configured to receive signals from the OLT; and
   a converter connected to the transmitter and the receiver and configured to exchange data between the transmitter, the receiver, and a user.

10. An optical network terminal (ONT) comprising:
    a processor coupled to a memory and configured to:
    promote sending of an optical network terminal management and control interface (OMCI) Description managed entity (ME) to an optical line terminal (OLT), wherein the OMCI Description ME is exempt from Management Information Base (MIB) upload and audit processes, and wherein the OMCI Description ME comprises:
    a single OMCI Object that describes a plurality of types of MEs supported by an OMCI at the ONT, wherein all of the MEs described by the OMCI object are supported by the OMCI at the ONT;

a plurality of Managed Entity Objects, whose instances describe each ME supported by the OMCI; and a plurality of Attribute Objects, whose instances describe each attribute supported by the OMCI, wherein the plurality of types of MEs supported by the OMCI at the ONT are not the same as a second plurality of types of MEs supported by a second ONT in the same passive optical network (PON) as the ONT.

11. The ONT of claim 10, wherein the processor is further configured to:

recognize connection to a passive optical network (PON);

recognize reception of a request for the OMCI Description ME from the OLT; and promote sending of the OMCI Description ME to the OLT in response to the request.

12. The ONT of claim 10, wherein the processor is further configured to:

update the OMCI Description ME; and promote sending of the updated OMCI Description ME to the OLT.

13. The ONT of claim 10, wherein the processor is further configured to recognize reception of a message from the OLT, wherein the message has been modified using the OMCI Description ME.

14. The network component of claim 1, wherein the OMCI features supported by the ONT is not the same as a second plurality of OMCI features supported by a second ONT in the same passive optical network (PON) as the ONT.

15. An apparatus comprising:

a processor coupled to a memory configured to store an optical network terminal management and control interface (OMCI) managed entity (ME) that describes an optical network terminal's (ONT's) general level of support for OMCI managed entities and messages, wherein the OMCI ME is not included in a Management Information Base (MIB) upload, and wherein the OMCI ME comprises:

an ME identification (ID) attribute that uniquely identifies each instance of the managed entity;

an ME type table attribute that lists a plurality of ME classes supported by the ONT, wherein each ME table entry contains a managed entity class value of a ME; and a Message type table attribute that is a list of message types supported by the ONT, wherein each Message type table entry contains a message type of an OMCI message.

16. The apparatus of claim 15, wherein the memory is part of an ONT, wherein the ONT is configured to update the OMCI ME in response to changes to OMCI features supported by the ONT and to forward the updated OMCI ME to an optical line terminal (OLT) in communication with the ONT.

17. The apparatus of claim 15, wherein the memory is part of an optical line terminal (OLT) configured receive the OMCI ME from an ONT and to adjust communications to the ONT associated with OMCI ME based on OMCI features identified in the OMCI ME.

18. The apparatus of claim 15, wherein the memory is part of an ONT in communication with an optical line terminal (OLT), wherein the ONT sends the OMCI ME to the OLT without being prompted by the OLT, and wherein the OLT requests the OMCI ME from the ONT as part of or after a connection initialization.

19. The apparatus of claim 15, wherein the OMCI ME comprises an access Object that identifies whether the OMCI ME was created by an ONT or an OLT, and wherein the memory is part of an ONT in communication with an optical line terminal (OLT), and wherein the OMCI ME enables the OLT to identify an OMCI version.supported by the ONT.

20. The apparatus of claim 15, wherein the memory is part of an ONT and is one of a plurality of ONTs configured to communicate with an optical line terminal (OLT) in a passive optical network, wherein each ONT provides only one OMCI ME to the OLT, wherein the OMCI MEs from the ONTs are not identical, and wherein the OMCI MEs allow the OLT to avoid sending messages with unsupported OMCI features to the ONTs.

* * * * *